(12) United States Patent
Uno et al.

(10) Patent No.: US 9,934,584 B2
(45) Date of Patent: Apr. 3, 2018

(54) LINE-OF-MOVEMENT GENERATING APPARATUS, LINE-OF-MOVEMENT GENERATING METHOD, AND NON-TRANSITORY COMPUTER READABLE MEDIUM

(71) Applicant: FUJI XEROX CO., LTD., Tokyo (JP)

(72) Inventors: Yusuke Uno, Kanagawa (JP); Masatsugu Tonoike, Kanagawa (JP); Daisuke Ikeda, Kanagawa (JP); Yusuke Yamaura, Kanagawa (JP); Jun Shingu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 45 days.

(21) Appl. No.: 15/237,127

(22) Filed: Aug. 15, 2016

(65) Prior Publication Data

US 2017/0278253 A1 Sep. 28, 2017

(30) Foreign Application Priority Data

Mar. 25, 2016 (JP) .................................. 2016-061560

(51) Int. Cl.
*G06T 7/20* (2017.01)
*H04N 5/232* (2006.01)

(52) U.S. Cl.
CPC ........... *G06T 7/2033* (2013.01); *H04N 5/232* (2013.01); *G06T 2207/10004* (2013.01)

(58) Field of Classification Search
CPC ........... G06K 9/00335; G06K 9/00342; G06K 9/00771; G06T 7/20; G06T 7/223; G06T 7/247; G06T 7/251; G06T 7/97; G06T 2207/30232

See application file for complete search history.

(56) References Cited

U.S. PATENT DOCUMENTS

| 8,391,548 | B1* | 3/2013 | Medioni et al. | ............... 382/103 |
| 2011/0199461 | A1* | 8/2011 | Horio et al. | ..................... 348/46 |
| 2012/0020518 | A1* | 1/2012 | Taguchi | ........................ 382/103 |
| 2014/0379296 | A1* | 12/2014 | Nathan et al. | ......... G01B 21/00 702/150 |
| 2015/0091944 | A1* | 4/2015 | Matsumoto et al. | ..... G06T 7/20 345/633 |

OTHER PUBLICATIONS

Benfold et al, "Stable Multi-Target Tracking in Real-Time Surveillance Video," Proceedings of the 2011 IEEE Conference on Computer Vision and Pattern Recognition, pp. 3457-3464, Jun. 2011.

* cited by examiner

Primary Examiner — Andrew W Johns
(74) Attorney, Agent, or Firm — Oliff PLC (57) ABSTRACT

A line-of-movement generating apparatus includes an acquisition unit, a detection unit, an extraction unit, a setting unit, a calculation unit, and a confirmation unit. The acquisition unit acquires images captured by an image capturing device at respective multiple time points. The detection unit detects one or more moving objects from the images. The extraction unit extracts a line of movement of each of the detected one or more moving objects. The setting unit sets a region where a line of movement tends to have a missing portion in an image captured by the image capturing device. The calculation unit calculates a likelihood indicating a degree of certainty of the extracted line of movement of each of the one or more moving objects. The confirmation unit confirms a line of movement of the one or more moving objects on the basis of the calculated likelihood.

6 Claims, 10 Drawing Sheets

LINE-OF-MOVEMENT LIKELIHOOD: LOW

FIG. 9B

LINE-OF-MOVEMENT LIKELIHOOD: HIGH

FIG. 10

LINE-OF-MOVEMENT GENERATING APPARATUS, LINE-OF-MOVEMENT GENERATING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-061560 filed Mar. 25, 2016.

BACKGROUND (i) Technical Field

The present invention relates to a line-of-movement generating apparatus, a line-of-movement generating method, and a non-transitory computer readable medium.

(ii) Related Art

There is known a technique that captures images of an open space in a commercial facility or the like, and by using the captured images, analyzes lines of movement of persons or counts the number of visitors.

SUMMARY

According to an aspect of the invention, there is provided a line-of-movement generating apparatus including an acquisition unit, a detection unit, an extraction unit, a setting unit, a calculation unit, and a confirmation unit. The acquisition unit acquires images captured by an image capturing device each at a corresponding one of multiple time points. The detection unit detects one or more moving objects from the images each captured at a corresponding one of multiple time points. The extraction unit extracts a line of movement of each of the detected one or more moving objects. The setting unit sets a region where a line of movement tends to have a missing portion in an image captured by the image capturing device. The calculation unit calculates a likelihood indicating a degree of certainty of the extracted line of movement of each of the one or more moving objects, the calculation unit calculating the likelihood according to an expression by which the likelihood decreases as a starting point or an ending point of the line of movement is further from the region. The confirmation unit confirms a line of movement of the one or more moving objects on the basis of the calculated likelihood.

BRIEF DESCRIPTION OF THE DRAWINGS

An exemplary embodiment of the present invention will be described in detail based on the following figures, wherein.

DETAILED DESCRIPTION

The present invention is an invention for generating a line of movement of a moving object present in an open space in a commercial facility or the like on the basis of captured images of the open space. Although the case where the moving object is a person will be described below, the present invention may be applied to generation of a line of movement of a moving object other than a person (e.g., animal).

Next, an outline of a process of generating a line of movement according to an embodiment of the present invention will be described.

Figure 1:
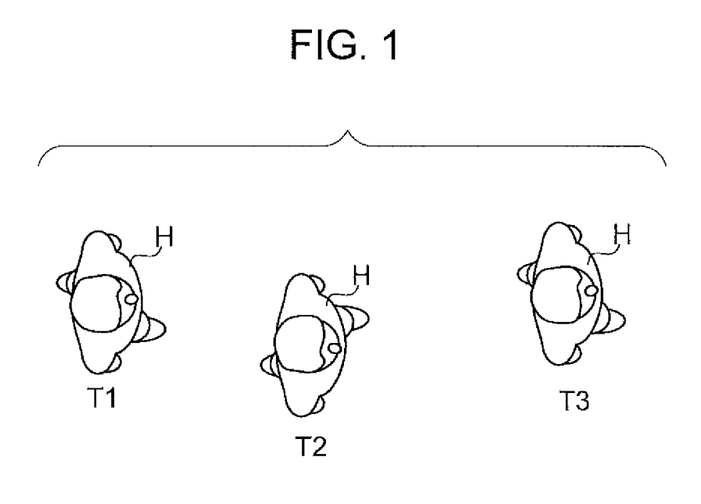
FIG. 1 illustrates how a person moves.
Figure 2:
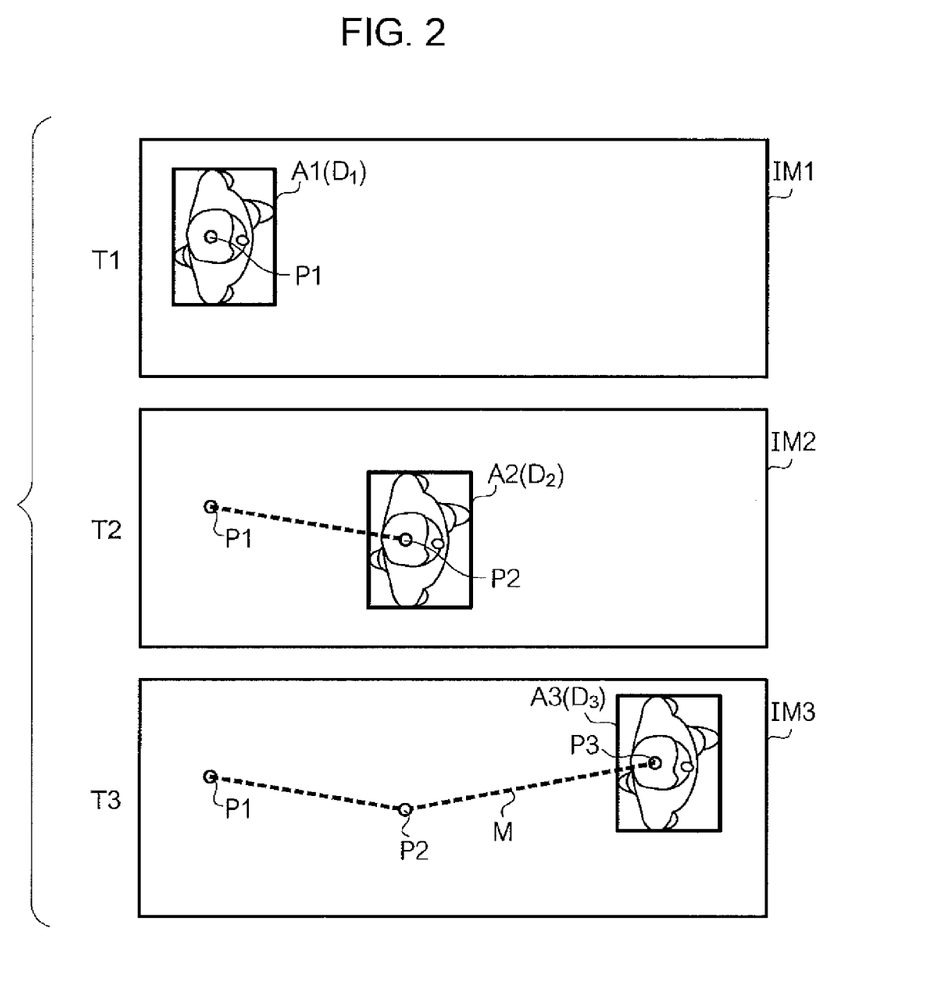
FIG. 2 illustrates a process related to detection of a person and extraction of a line of movement in which the person moves from captured images.

FIG. 1 illustrates how a person H present in an open space moves. In FIG. 1, positions where the person H is present at respective time points T1, T2, and T3 when seen from above are illustrated. FIG. 2 illustrates a process related to detection of the person H and extraction of a line of movement of the person H from captured images of the open space in which the person H is present. In FIG. 2, captured images IM1, IM2, and IM3 obtained at the time points T1, T2, and T3, respectively, are illustrated. Each of the captured images is a still image of a single frame included in a moving image.

The process for generating the line of movement according to the exemplary embodiment is broadly divided into "person detection", "line-of-movement extraction", "likelihood calculation for each line of movement", and "line-of-movement-likelihood calculation".

Firstly, a person is detected from the captured images in the chronological order of the time points for image capturing. Here, the person H is detected from the captured image IM1 first. Detection of a person may be performed according to a known algorithm, such as a background subtraction method or a method using histograms-of-oriented-gradient (HOG) feature amounts. From the captured image IM1, a person region A1 is detected. In the exemplary embodiment, a person region is defined by a circumscribed rectangle of a region of a captured person. The person region A1 has a dimension $D_1$. The dimension of a person region is defined by, for example, the area of the person region and may also be defined by the length of a side, the length of a diagonal, or the like. On the basis of the position of the person region A1, a position P1 of the person H at the time point T1 is specified. Although the position of the person corresponds to the center of gravity of the person's head in the exemplary embodiment, the position may correspond to another position within the person region.

Then, the person H is detected from the captured image IM2. From the captured image IM2, a person region A2 is detected. The person region A2 has a dimension $D_2$. On the basis of the position of the person region A2, a position P2 of the person H at the time point T2 is specified. Then, the person H is detected from the captured image IM3. From the captured image IM3, a person region A3 is detected. The person region A3 has a dimension $D_3$. On the basis of the position of the person region A3, a position P3 of the person H at the time point T3 is specified. Here, the position P1 corresponds to the starting point of a line of movement M, and the position P3 corresponds to the ending point of the line of movement M.

Secondly, on the basis of the regions where the person has been detected from the captured images, the line of movement of the person is extracted. The line of movement is specified by a combination of person regions detected from images captured at respective multiple time points. Here, by connecting the positions P1, P2, and P3 with a line in the chronological order of the time points for image capturing, the line of movement M of the person H is extracted.

Thirdly, the likelihood is calculated for each line of movement. The likelihood of a line of movement is a value indicating a degree of certainty of the extracted line of movement as a line of movement of a person. A likelihood $L_T(D)$ is calculated according to the following Expression (1), for example.

$$L_T(D) = L_{D1}(D_1) \prod_{i=2}^{n} L_{Di}(D_i) \quad (1)$$

In Expression (1), n is a natural number and is determined according to the number of person regions that form a single line of movement. In the case of the line of movement M, n=3 is satisfied. $L_{Di}(D_i)$ (i is a natural number) is a function including a dimension $D_i$ of a person region Ai as a variable. The dimension of the person region is considered to fall within a certain range according to the size of the person's body. That is, the dimension of the detected person region serves as an indicator for determining whether it is certain that a person has been detected or whether noise or the like has been erroneously detected as a person.

Specifically, when i=1 is satisfied, $L_{Di}(D_i)$, i.e., $L_{D1}(D_1)$, is a function including the dimension $D_1$ of the person region A1 as a variable. $L_{D1}(D_1)$ increases as the certainty of the dimension $D_1$ indicating the dimension of a person region increases, and $L_{D1}(D_1)$ decreases as the certainty of the dimension $D_1$ indicating the dimension of a person region decreases. Here, a condition $0 \leq L_{D1}(D_1) \leq 1$ is satisfied. $L_{D1}(D_1)$ may be a linear function, a quadratic function, a higher-degree function, or another function.

When i≥2 is satisfied, $L_{Di}(D_i)$ is a function including, as variables, the dimension $D_i$ of the person region Ai and a value according to the positional relationship between the detected person region Ai and a person region Ai−1. The positional relationship is specified by, for example, the distance between the person region Ai and the person region Ai−1 and the direction from one of the person region Ai and the person region Ai−1 to the other. When i≥2 is satisfied, $L_{Di}(D_i)$ has a value according to the degree of certainty of the dimension $D_i$ indicating the dimension of a person region and the degree of certainty of the positional relationship between the person region Ai and the person region Ai−1 indicating movement of a person. Here, a condition $0 \leq L_{Di}(D_i) \leq 1$ is satisfied. When i≥2 is satisfied, $L_{Di}(D_i)$ may be a linear function, a quadratic function, a higher-degree function, or another function.

Fourthly, a line-of-movement likelihood is calculated. The likelihood $L_T(D)$ indicates the degree of certainty of a single line of movement. However, in some cases, multiple lines of movement may be extracted from captured images. Although the multiple lines of movement typically indicate lines of movement of multiple persons, depending on the case, noise included in the captured images may be extracted as a line of movement. Accordingly, the line-of-movement likelihood is calculated as a value indicating the degree of certainty of one or more lines of movement as a whole extracted from the captured images. The line-of-movement likelihood is specifically a product of likelihoods $L_T(D)$ of one or more lines of movement. The line-of-movement likelihood is equal to the likelihood $L_T(D)$ in the case where a single line of movement has been extracted. A larger value of the line-of-movement likelihood indicates a larger degree of certainty of the extracted one or more lines of movement.

In the exemplary embodiment, "line-of-movement extraction" is performed by random sampling using a Markov chain Monte Carlo method. Specifically, multiple sets of lines of movement are extracted by changing at random, by using random numbers, the combination of person regions detected from the images captured at the respective multiple time points. Here, the case where the person region Ai has been extracted as illustrated in the upper part of FIG. 3 will be discussed. In this part, each rectangle indicates a person region Ai. In this illustration, multiple sets of lines of movement (see dashed lines in FIG. 3) having different combinations of person regions are extracted as illustrated in "first result of line-of-movement extraction", "second result of line-of-movement extraction", . . . in FIG. 3.

Figure 3:
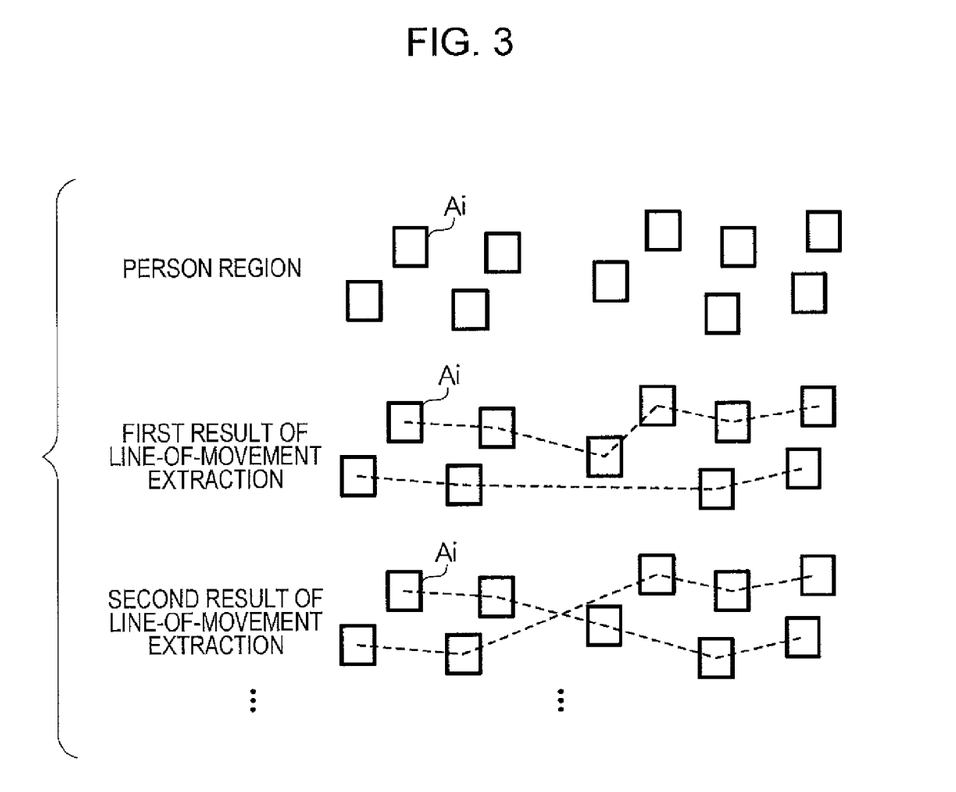
FIG. 3 illustrates a process related to extraction of lines of movement in which persons move.

The processes "likelihood calculation for each line of movement" and "line-of-movement-likelihood calculation" are performed for each of the multiple sets of lines of movement. Specifically, upon calculation of a line-of-movement likelihood regarding a result of extraction of a certain line of movement, the line-of-movement likelihood is compared with the highest line-of-movement likelihood among previously calculated line-of-movement likelihoods regarding results of extraction of other lines of movement. Then, a result of line-of-movement extraction having a higher line-of-movement likelihood is selected. Then, the combination of person regions that form at least some of the lines of movement in the selected result of line-of-movement extraction is changed at random, thereby calculating the line-of-movement likelihood again. The calculated line-of-movement likelihood is compared with the highest line-of-movement likelihood at this time point, and a result of line-of-movement extraction having a higher line-of-movement likelihood is selected. After this process is iterated a prescribed number of times, a result of line-of-movement extraction having the highest line-of-movement likelihood is eventually confirmed (determined) to be one or more lines of movement extracted from the captured images.

However, merely employing this method may fail to generate an original line of movement in some cases. In these cases, a line of movement is cut in the middle (has a missing portion), although the line of movement is supposed to be a continuous line, owing to noise or other factors included in the captured images. The line-of-movement generating apparatus according to the exemplary embodiment has a configuration that addresses this issue.

Figure 4:
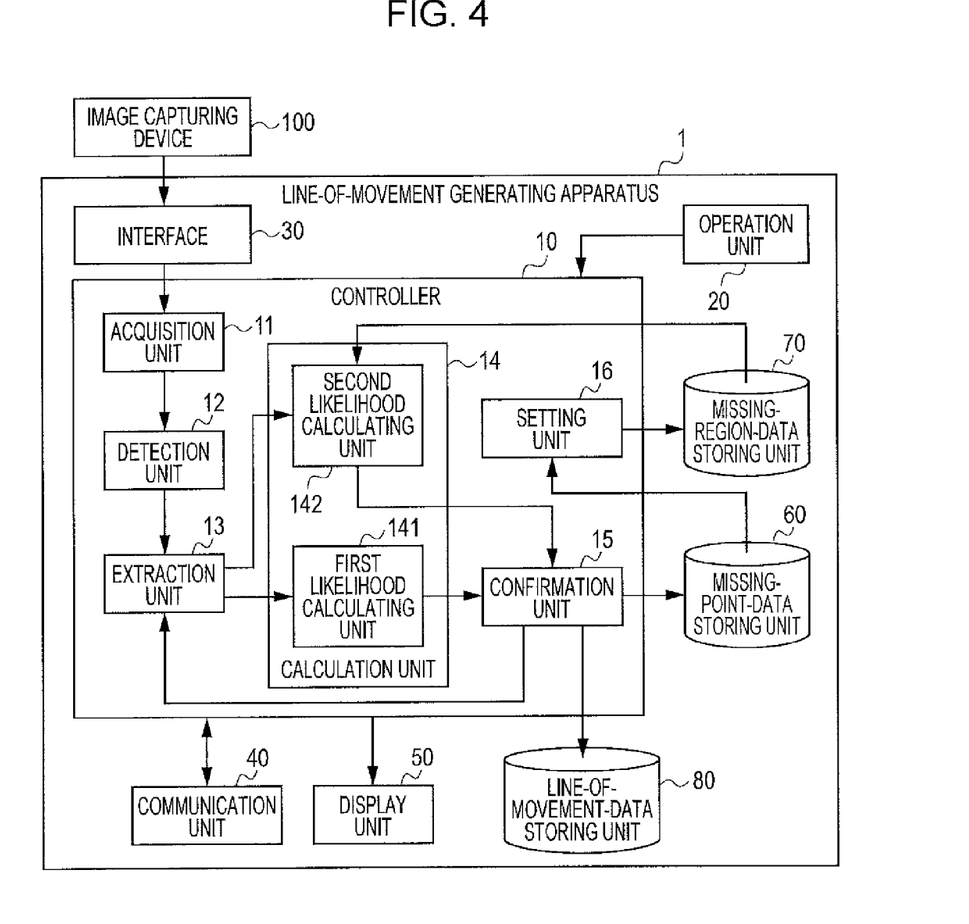
FIG. 4 is a block diagram illustrating a configuration of a line-of-movement generating apparatus according to an exemplary embodiment of the present invention.

FIG. 4 is a block diagram illustrating a configuration of a line-of-movement generating apparatus 1 according to the exemplary embodiment. The line-of-movement generating apparatus 1 includes a controller 10, an operation unit 20, an interface 30, a communication unit 40, a display unit 50, a missing-point-data storing unit 60, a missing-region-data storing unit 70, and a line-of-movement-data storing unit 80.

The controller 10 includes a processor including, for example, a central processing unit (CPU), a read only memory (ROM), and a random access memory (RAM). The CPU controls each unit of the line-of-movement generating apparatus 1 by reading to the RAM a program stored in the ROM and executing the program.

The operation unit 20 includes a touch sensor or hardware key pad, for example, and receives operations performed by a user. The interface 30 is an interface to be connected to an image capturing device 100. The image capturing device 100 is installed in such a manner as to capture images of an open space for which a line of movement is to be generated. The image capturing device 100 outputs, to the interface 30, captured images obtained by image capturing in the order the images were captured (in the order of frames), for example. The communication unit 40 includes a modem, for example, and performs communication by being connected to a communication line, such as a line to the Internet. The display unit 50 includes a liquid crystal display, for example, and displays images on a display surface.

The missing-point-data storing unit 60, the missing-region-data storing unit 70, and the line-of-movement-data storing unit 80 are formed by one or more memory devices (e.g., hard disk device).

The missing-point-data storing unit 60 stores missing point data. The missing point data is data indicating the position where a line of movement is missing in a captured image, and is specifically data indicating the position of the starting point or ending point of the line of movement.

The missing-region-data storing unit 70 stores missing region data indicating a missing region. The missing region data is data unique to the image capturing device 100 and is data indicating a region (hereinafter referred to as "missing region") where a line of movement tends to be missing in an image captured by the image capturing device 100.

The line-of-movement-data storing unit 80 stores line-of-movement data indicating a confirmed line of movement. The line-of-movement data is used in order to count the number of visitors or for other purposes.

The controller 10 realizes functions corresponding to an acquisition unit 11, a detection unit 12, an extraction unit 13, a calculation unit 14, a confirmation unit 15, and a setting unit 16. The calculation unit 14 further includes a first likelihood calculating unit 141 and a second likelihood calculating unit 142.

The acquisition unit 11 acquires, through the interface 30, the images obtained by the image capturing device 100 capturing images at respective multiple time points. The detection unit 12 detects one or more persons from the acquired images captured at the multiple time points. The extraction unit 13 extracts, on the basis of person regions where the detected one or more persons are present, a line of movement of each of the one or more persons. The extraction unit 13 extracts multiple sets of lines of movement by changing the combination of the person regions by random sampling using the Markov chain Monte Carlo method.

The calculation unit 14 calculates a likelihood $L_T(D)$ of each of the extracted lines of movement. The first likelihood calculating unit 141 calculates the likelihood $L_T(D)$ according to Expression (1). The second likelihood calculating unit 142 calculates the likelihood $L_T(D)$ not according to Expression (1) but according to an expression (Expression (2) described later) by which the likelihood $L_T(D)$ decreases as the starting point or ending point of a line of movement is further from a missing region.

On the basis of the likelihoods $L_T(D)$ calculated by the calculation unit 14, the confirmation unit 15 confirms the line of movement of the one or more persons. For each of the extracted multiple sets of lines of movement, the confirmation unit 15 calculates a product of the likelihoods $L_T(D)$ as a line-of-movement likelihood and confirms a line of movement having the highest line-of-movement likelihood. The confirmation unit 15 causes line-of-movement data indicating the confirmed line of movement to be stored in the line-of-movement-data storing unit 80. In addition, on the basis of the starting point and ending point of the confirmed line of movement, the confirmation unit 15 records missing point data in the missing-point-data storing unit 60.

The setting unit 16 sets a missing region in an image captured by the image capturing device 100. On the basis of the missing point data stored in the missing-point-data storing unit 60, the setting unit 16 specifies distribution of missing points in the captured image and sets a missing region on the basis of the distribution. The setting unit 16 records the missing region data indicating the missing region in the missing-region-data storing unit 70. On the basis of the missing region data stored in the missing-region-data storing unit 70, the second likelihood calculating unit 142 calculates the likelihood $L_T(D)$.

Figure 5:
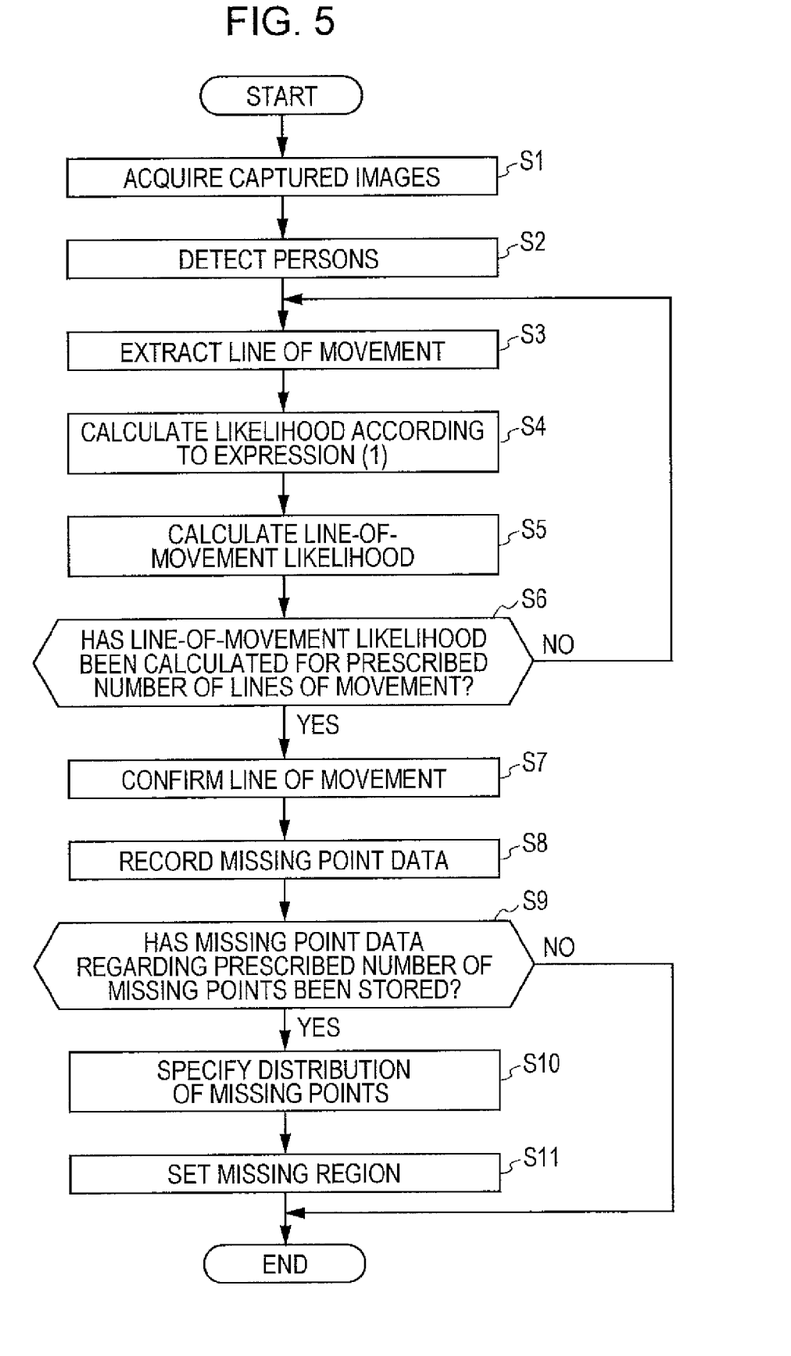
FIG. 5 is a flowchart illustrating a process related to setting of a missing region, the process being performed by the line-of-movement generating apparatus according to the exemplary embodiment.

FIG. 5 illustrates a process related to setting of the missing region, the process being performed by the line-of-movement generating apparatus 1. FIGS. 6A, 6B, 7A, 7B, and 7C illustrate specific exemplary processes related to setting of missing regions.

Figure 6A:
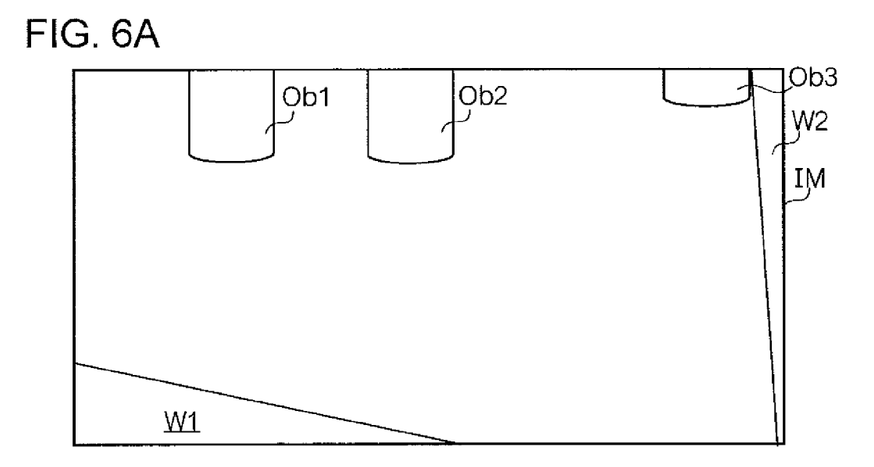
FIGS. 6A and 6B illustrate a specific exemplary process related to setting of missing regions according to the exemplary embodiment.

The controller 10 acquires captured images from the image capturing device 100 through the interface 30 (step S1). FIG. 6A illustrates a captured image IM obtained in the case where an image of certain open space is captured from above in an obliquely downward direction. The captured image IM includes walls W1 and W2 and pillars Ob1, Ob2, and Ob3 as structures that may possibly affect a line of movement of a person. Hereinafter, any image captured by the image capturing device 100 is referred to as a "captured image IM" without particularly distinguishing the time points for image capturing.

Figure 6B:
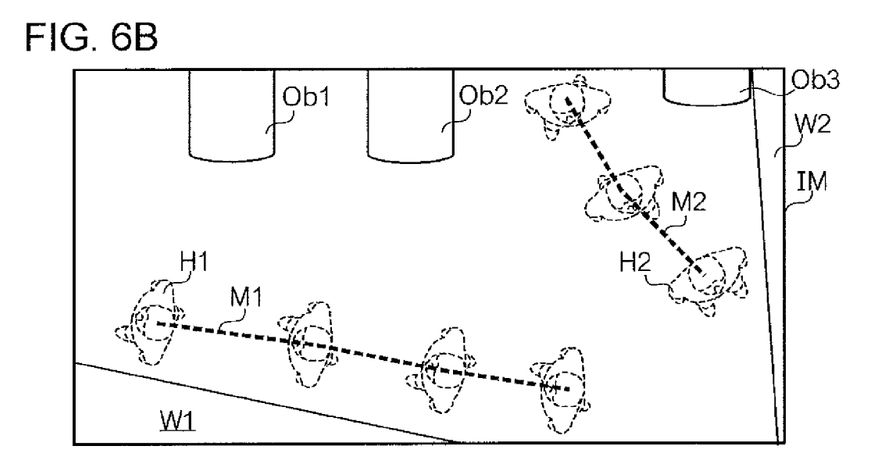

Then, the controller 10 detects persons from the images captured at respective multiple time points (step S2), the images having been acquired in step S1. Then, on the basis of person regions where the detected persons are present, the controller 10 extracts a line of movement of each of the persons (step S3). Here, it is assumed that a line of movement M1 of a person H1 and a line of movement M2 of a person H2 are extracted as illustrated in FIG. 6B.

Then, according to Expression (1), the controller 10 calculates a likelihood $L_T(D)$ of each of the extracted lines of movement (step S4). In the case of FIG. 6B, the controller 10 calculates a likelihood $L_T(D)$ of the line of movement M1 and a likelihood $L_T(D)$ of the line of movement M2. Then, the controller 10 calculates, as a line-of-movement likelihood, a product of the likelihoods $L_T(D)$ of the extracted one or more lines of movement (step S5). In the case of FIG. 6B, the controller 10 calculates, as the line-of-movement likelihood, a product of the likelihood $L_T(D)$ of the line of movement M1 and the likelihood $L_T(D)$ of the line of movement M2.

Next, the controller 10 determines whether or not the line-of-movement likelihood has been calculated for a prescribed number of lines of movement (step S6). The prescribed number is a number determined in advance and is "1000", for example. If the determination in step S6 is "NO", the controller 10 returns to step S3. Then, the controller 10 extracts another line of movement by changing the combination of the person regions. Then, the controller 10 calculates a likelihood $L_T(D)$ according to Expression (1) and calculates a line-of-movement likelihood. Step S3 through step S6 are performed by random sampling using the above-described Markov chain Monte Carlo method.

Upon calculation of the line-of-movement likelihood for a prescribed number of lines of movement, the controller 10 determines "YES" in step S6. Then, the controller 10 confirms, as a line of movement of a person, a line of movement having the highest line-of-movement likelihood at this time point (step S7). Here, it is assumed that the line of movement M1 of the person H1 and the line of movement M2 of the person H2 are confirmed.

Figure 7A:
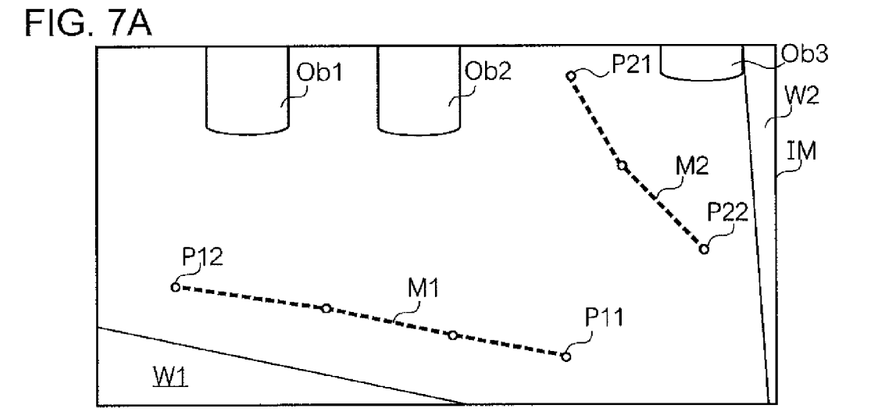
FIGS. 7A, 7B, and 7C illustrate a specific exemplary process related to setting of missing regions according to the exemplary embodiment.

Then, on the basis of the starting point and ending point of the confirmed line of movement, the controller 10 records missing point data the missing-point-data storing unit 60 (step S8). Here, the missing point data recorded by the controller 10 includes missing points at the following positions as illustrated in FIG. 7A: a position P11, which is the starting point of the line of movement M1; a position P12, which is the ending point thereof; a position P21, which is the starting point of the line of movement M2; and a position P22, which is the ending point thereof.

Then, the controller 10 determines whether or not missing point data regarding a prescribed number of missing points has been stored in the missing-point-data storing unit 60 (step S9). The prescribed number is a number determined in advance and is "1000", for example. In the case where the determination in step S9 is "NO", the controller 10 ends the process in FIG. 5.

By iterating step S1 through step S8, the line-of-movement generating apparatus 1 records (stores) missing point data in the missing-point-data storing unit 60.

When the number of missing points in the missing point data stored in the missing-point-data storing unit 60 increases to reach the prescribed number, the controller 10 determines "YES" in step S9 and proceeds to step S10. Then, on the basis of the missing point data stored in the missing-point-data storing unit 60, the controller 10 specifies distribution of missing points (step S10). Here, the controller 10 specifies a region having a relatively high density of missing points by performing clustering on the basis of missing points plotted on a captured image. The algorithm for clustering is, for example, k-means clustering, minimum mean distribution, or nearest neighbor distance, but is not limited to a particular one.

Then, on the basis of the specified distribution of the missing points, the controller 10 sets, as a missing region, a regions where the line of movement tends to be missing in a captured image (step S11). In step S11, the controller 10 records missing region data indicating the set missing region in the missing-region-data storing unit 70.

Figure 7B:
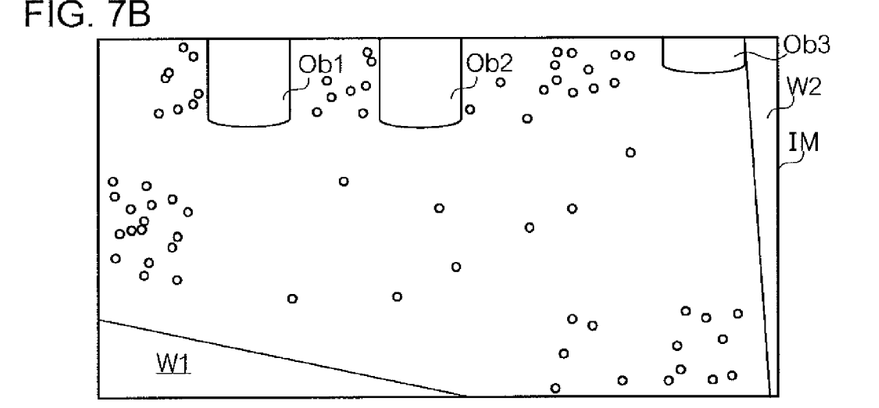
Figure 7C:
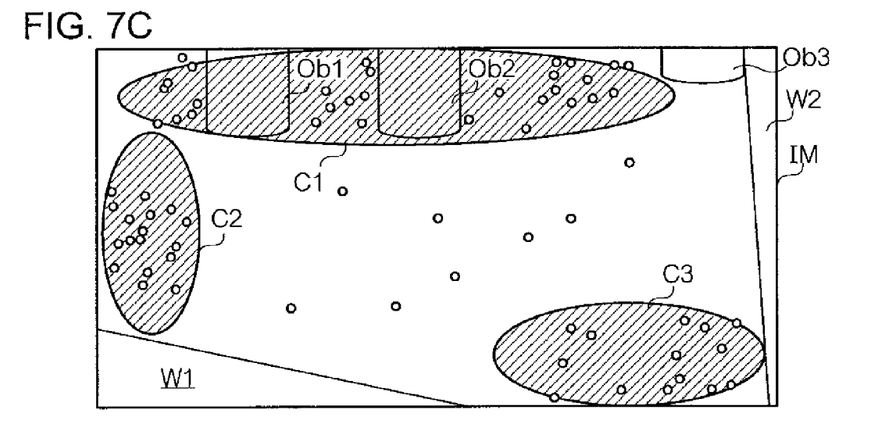

Here, the case where the missing points are distributed as illustrated in FIG. 7B in the captured image IM will be discussed. In the illustration, each circle represents a missing point. In this case, the controller 10 sets missing regions C1, C2, and C3 as illustrated in FIG. 7C, for example. Missing points are supposed to appear at and near a doorway or at and near obstruction, such as positions behind the pillars Ob1, Ob2, and Ob3, with a high frequency. In other words, missing points do not appear with a high frequency in a region which is not at or near the doorway and not at or near obstruction, such as a region at and near the center of the captured image IM. As illustrated in FIG. 7B, missing points appearing in such a region, although the number thereof is small, are generated as a result of noise or the like included in the captured image. Accordingly, there is a low possibility that a missing point appearing in such a region indicates the starting point or ending point of an original line of movement of a person. For this reason, the controller 10 excludes, from missing regions, a region with no missing points and a region having a density of missing points that is lower than a fixed value.

The process performed by the controller 10 related to setting of the missing region has been described above.

Figure 8:
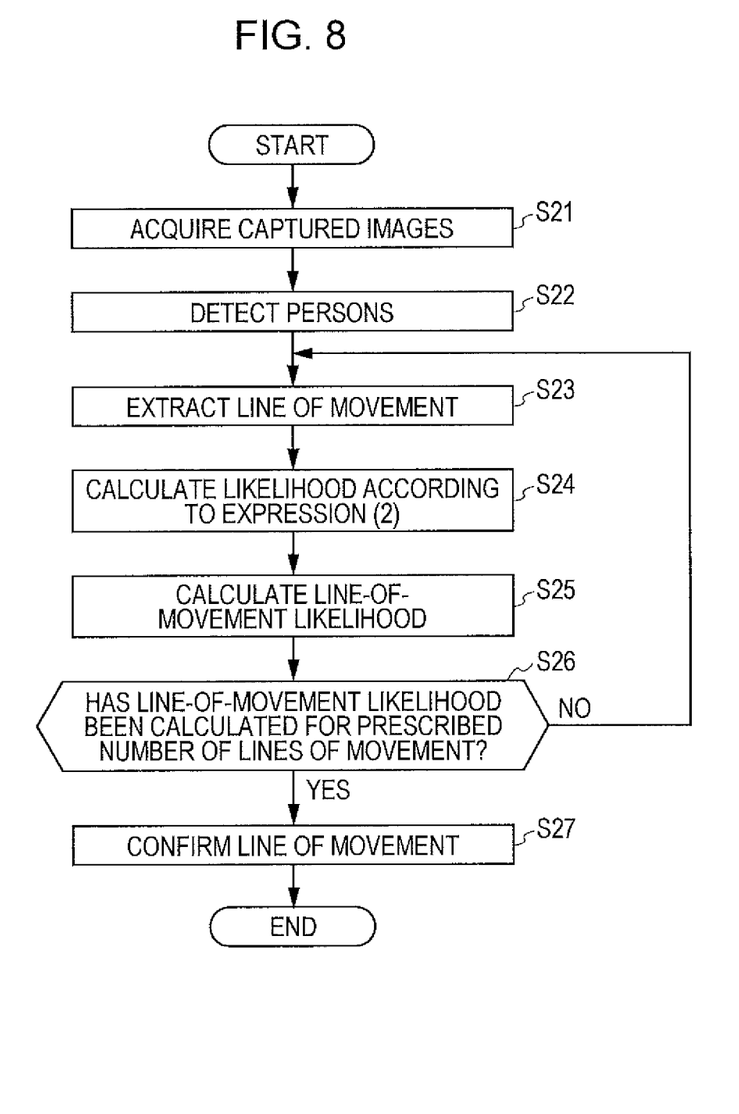
FIG. 8 is a flowchart illustrating a process of generating a line of movement, the process being performed by the line-of-movement generating apparatus according to the exemplary embodiment on the basis of the missing region.

FIG. 8 is a flowchart illustrating a process related to generation of a line of movement on the basis of a missing region, the process being performed by the line-of-movement generating apparatus 1.

The controller 10 acquires captured images from the image capturing device 100 through the interface 30 (step S21). Then, the controller 10 detects persons from the images captured at respective multiple time points (step S22), the images being acquired in step S21. Then, on the basis of person regions where the detected persons are present, the controller 10 extracts a line of movement of each of the persons (step S23). Steps S21, S22, and S23 are the same as steps S1, S2, and S3, respectively.

Then, according to the following Expression (2), the controller 10 calculates a likelihood $L_T(D)$ of each line of movement (step S24).

$$L_T(D) = L'_{D1}(D_1) \prod_{i=2}^{n} L_{Di}(D_i) \quad (2)$$

where $L'_{D1}(D_1) = L_{D1}(D_1)L_V(D_1) \quad L_V \sim N(\mu_j, \sigma_j^2)$

Expression (2) corresponds to an expression in which "$L_{D1}(D_1)$" in Expression (1) is replaced by "$L'_{D1}(D_1)$". $L'_{D1}(D_1)$ is a function obtained by multiplying the function $L_{D1}(D_1)$, which is used in Expression (1), by a function $L_V(D_1)$. $L_V(D_1)$ increases as the distance decreases between the starting point of a line of movement and a point (e.g., the center of gravity) within a missing region that is the closest to the starting point, and $L_V(D_1)$ decreases as the distance increases. $L_V(D_1)$ is a function of normal distribution of means $\mu_j$ and distribution $\sigma_j^2$. However, $L_V(D_1)$ is not limited thereto and may be a linear function, a quadratic function, a higher-degree function, or another function.

Then, the controller 10 calculates, as a line-of-movement likelihood, a product of the calculated likelihoods $L_T(D)$ (step S25). Next, the controller 10 determines whether or not the line-of-movement likelihood has been calculated for a prescribed number of lines of movement (step S26). If the determination in step S26 is "NO", the controller 10 returns to step S23. If the determination in step S26 is "YES", the controller 10 confirms, as a line of movement of a person, a line of movement having the highest line-of-movement likelihood at this time point (step S27). Steps S25, S26, and S27 are the same as steps S5, S6, and S7, respectively.

If a likelihood $L_T(D)$ of a certain line of movement calculated according to Expression (2) is compared with a likelihood $L_T(D)$ thereof calculated according to Expression (1), the likelihood $L_T(D)$ calculated according to Expression (2) has a smaller value than the likelihood $L_T(D)$ calculated according to Expression (1) as the starting point of the line of movement is further from a missing region. Accordingly, if the extracted line of movement has a starting point far from the missing region, the line-of-movement likelihood is also low, and there is a low possibility that the line of movement is eventually confirmed as a line of movement of a person.

Figure 9A:
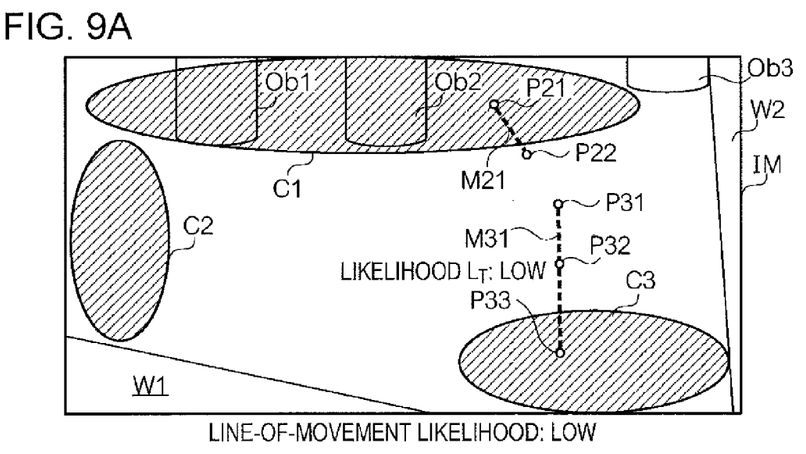
FIGS. 9A and 9B illustrate a specific exemplary process for generating a line of movement on the basis of missing regions according to the exemplary embodiment.

Here, the case will be discussed where a line of movement M21 and a line of movement M31, which are illustrated in FIG. 9A, are extracted in step S23. The line of movement M21 is a line of movement connecting the position P21 and the position P22. The line of movement M31 is a line of movement connecting a position P31, a position P32, and a position P33. As a result of calculation according to Expression (1), there is a possibility that the line of movement M21 and the line of movement M31 are eventually confirmed. However, as a result of calculation according to Expression (2), there is a possibility that the line of movement M21 and the line of movement M31 do not represent an original line of movement because the position P31, which is the starting point of the line of movement M31, is relatively far from the missing region C1.

Figure 9B:
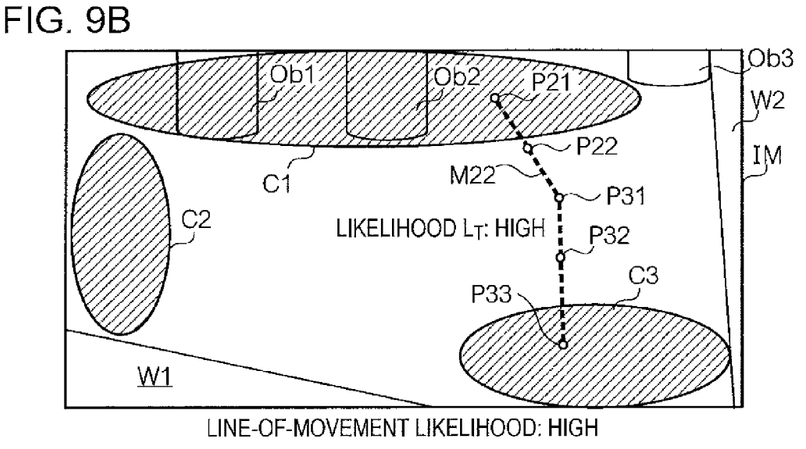

In contrast, in the case of FIG. 9B, a line of movement M22 connecting the positions P21, P22, P31, P32, and P33 is extracted. As a result of calculation according to Expression (2), there is a possibility that the line-of-movement likelihood in the case where the line of movement is extracted as illustrated in FIG. 9B is higher than that in the case where the line of movement is extracted as illustrated in the FIG. 9A. This is because the position P21, which is the starting point of the line of movement M31, is located within the missing region C1. In this manner, it is considered that there is a relatively high possibility that the line of movement having a starting point within a missing region is an original line of movement of a person. As a result of calculation according to Expression (2), the possibility of confirming the line of movement M22, not the line of movement M21 or the line of movement M31, is higher than in the case of calculation according to Expression (1), and accordingly, a line of movement having a higher degree of certainty as a line of movement of a person is more likely to be confirmed.

The process performed by the controller 10 related to generation of a line of movement on the basis of a missing region has been described above.

As described above, according to the line-of-movement generating apparatus 1, a line of movement of a moving object is accurately generated as compared with the case where a line of movement of a moving object is generated by not taking into account a region where a line of movement tends to be cut. In addition, on the basis of the result of actual generation of a line of movement, the line-of-movement generating apparatus 1 sets a missing region according to an open space.

The present invention may be implemented in an exemplary embodiment different from the above-described exemplary embodiment. In addition, modifications described below may be combined with each other.

Figure 10:
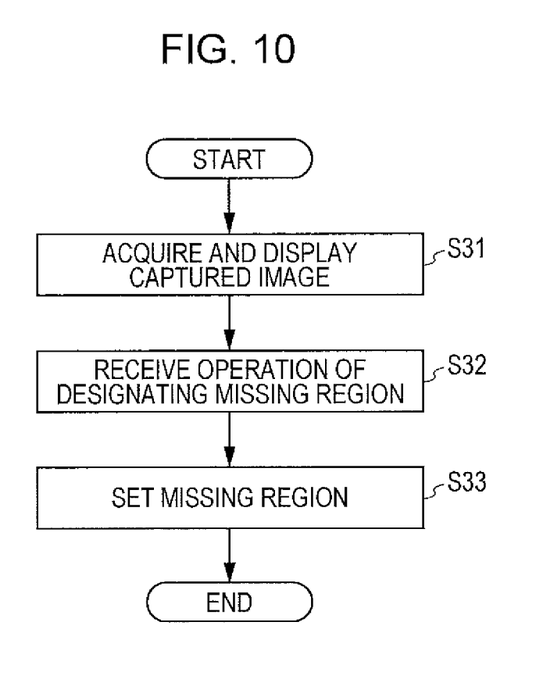
FIG. 10 is a flowchart illustrating a process related to setting of a missing region, the process being performed by the line-of-movement generating apparatus according to a modification of the present invention.

The line-of-movement generating apparatus 1 may set a missing region that has been designated through a user operation. FIG. 10 is a flowchart illustrating a process related to setting of a missing region, the process being performed by the line-of-movement generating apparatus 1.

The controller 10 acquires a captured image from the image capturing device 100 through the interface 30 and displays the captured image on the display unit 50 (step S31). The captured image displayed on the display unit 50 is, for example, the same as the captured image IM illustrated in FIG. 6A.

Then, in the state where the captured image is displayed on the display unit 50, the controller 10 receives a user operation of designating a missing region through the operation unit 20 (step S32). A user visually confirms the image displayed on the display unit 50 and designates the missing region by operating the operation unit 20. Then, the controller 10 sets the missing region designated through the operation unit 20 (step S33). That is, the controller 10 records missing region data in accordance with the user operation in the missing-region-data storing unit 70.

By using a configuration in which the user designates the missing region, the line-of-movement generating apparatus 1 sets the missing region without using a result of actual generation of a line of movement.

The line-of-movement generating apparatus 1 may select a method for setting the missing region depending on the mode.

The line-of-movement generating apparatus 1 may generate a line of movement on the basis of a captured image obtained by a wide-angle camera, such as a fish-eye camera, i.e., a captured image including distortion caused by the imaging lens. In the exemplary embodiment of the present invention, specs of the image capturing device are not limited to particular ones.

The line-of-movement generating apparatus 1 may extract a line of movement without random sampling using a Markov chain Monte Carlo method.

Expression (2) is merely an exemplary expression for calculating a likelihood of a line of movement. It is sufficient for the line-of-movement generating apparatus 1 to calculate the likelihood according to an expression by which the likelihood decreases as the distance from a missing region increases. In addition, according to Expression (2), a likelihood in accordance with the distance between the starting point of a line of movement and a missing region is calculated. However, the line-of-movement generating apparatus 1 may calculate a likelihood in accordance with the distance between the ending point of a line of movement and a missing region or the distance between each of the starting point and the ending point of a line of movement and a missing region.

The line-of-movement generating apparatus 1 may output, by displaying, transmitting, printing, or another method, data indicating a confirmed line of movement in place of or in addition to recording it in the line-of-movement-data storing unit 80.

The hardware configuration and functional configuration of the line-of-movement generating apparatus 1 are not limited to those described above in the exemplary embodiment.

Each function realized by the controller 10 of the line-of-movement generating apparatus 1 according to the above-described exemplary embodiment may be implemented by one or more hardware circuits, by an arithmetic device executing one or more programs, or by a combination thereof. In addition, in the case where the functions of the controller 10 are implemented by using programs, the programs may be provided by being stored in a computer readable recording medium, such as a magnetic recording medium (e.g., magnetic tape or magnetic disk (e.g., hard disk drive (HDD) or flexible disk (FD)), an optical recording medium (e.g., optical disc), a magneto-optical recording medium, or a semiconductor memory, or may be distributed through a network. In addition, the present invention may be provided as a computer implemented line-of-movement generating method.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A line-of-movement generating apparatus comprising:
    an acquisition unit that acquires images captured by an image capturing device each at a corresponding one of a plurality of time points;
    a detection unit that detects one or a plurality of moving objects from the images each captured at a corresponding one of the plurality of time points;
    an extraction unit that extracts a line of movement of each of the detected one or plurality of moving objects;
    a setting unit that sets a region where a line of movement tends to have a missing portion in an image captured by the image capturing device;
    a calculation unit that calculates a likelihood indicating a degree of certainty of the extracted line of movement of each of the one or plurality of moving objects, the calculation unit calculating the likelihood according to an expression by which the likelihood decreases as a starting point or an ending point of the line of movement is further from the region; and
    a confirmation unit that confirms a line of movement of the one or plurality of moving objects on the basis of the calculated likelihood.

2. The line-of-movement generating apparatus according to claim 1,
    wherein the extraction unit extracts a plurality of sets of lines of movement by changing a combination of moving objects detected from the images each captured at a corresponding one of the plurality of time points, and
    wherein, among the plurality of sets of lines of movement, the confirmation unit confirms a line of movement having a largest product of likelihoods of the extracted one or plurality of lines of movement.

3. The line-of-movement generating apparatus according to claim 1, wherein the setting unit sets the region on the basis of distribution of a starting point or an ending point of the confirmed line of movement of the one or plurality of moving objects.

4. The line-of-movement generating apparatus according to claim 1, wherein the setting unit sets the region on the basis of an operation for designating the region.

5. A line-of-movement generating method comprising:
    acquiring images captured by an image capturing device each at a corresponding one of a plurality of time points;
    detecting one or a plurality of moving objects from the images each captured at a corresponding one of the plurality of time points;
    extracting a line of movement of each of the detected one or plurality of moving objects;
    setting a region where a line of movement tends to have a missing portion in an image captured by the image capturing device;
    calculating a likelihood indicating a degree of certainty of the extracted line of movement of each of the one or plurality of moving objects, the likelihood being calculated according to an expression by which the likelihood decreases as a starting point or an ending point of the line of movement is further from the region; and
    confirming a line of movement of the one or plurality of moving objects on the basis of the calculated likelihood.

6. A non-transitory computer readable medium storing a program causing a computer to execute a process for generating a line of movement, the process comprising:
    acquiring images captured by an image capturing device each at a corresponding one of a plurality of time points;
    detecting one or a plurality of moving objects from the images each captured at a corresponding one of the plurality of time points;
    extracting a line of movement of each of the detected one or plurality of moving objects;
    setting a region where a line of movement tends to have a missing portion in an image captured by the image capturing device;
    calculating a likelihood indicating a degree of certainty of the extracted line of movement of each of the one or plurality of moving objects, the likelihood being calculated according to an expression by which the likelihood decreases as a starting point or an ending point of the line of movement is further from the region; and
    confirming a line of movement of the one or plurality of moving objects on the basis of the calculated likelihood.

* * * * *